(12) United States Patent
Das et al.

(10) Patent No.: US 9,231,434 B2
(45) Date of Patent: Jan. 5, 2016

(54) CHARGING A BATTERY USING A MULTI-RATE CHARGE

(75) Inventors: Ripan Das, Beaverton, OR (US); Nagasubramanian Gurumoorthy, Portland, OR (US); Andy Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 13/533,352

(22) Filed: Jun. 26, 2012

(65) Prior Publication Data
US 2013/0342173 A1 Dec. 26, 2013

(51) Int. Cl.
*H02J 7/04* (2006.01)
*H02J 7/16* (2006.01)

(52) U.S. Cl.
CPC *H02J 7/045* (2013.01); *H02J 7/041* (2013.01)

(58) Field of Classification Search
CPC ....... H02J 7/008; H02J 7/0073; H02J 7/0081; H02J 7/14; H02J 7/0068; Y02E 60/12; H01M 10/44; H01M 10/441
USPC .......................................................... 320/162
See application file for complete search history.

(56) References Cited

U.S. PATENT DOCUMENTS

| | | | |
|---|---|---|---|
| 5,617,007 A | 4/1997 | Keidl et al. | |
| 6,441,587 B2 | 8/2002 | Okada et al. | |
| 6,798,174 B2 | 9/2004 | Cornett et al. | |
| 7,898,220 B2 | 3/2011 | Guang et al. | |
| 2001/0048289 A1* | 12/2001 | Sakakibara | 320/150 |
| 2002/0060554 A1* | 5/2002 | Odaohhara et al. | 320/134 |
| 2002/0093312 A1* | 7/2002 | Choo | 320/149 |
| 2002/0149345 A1* | 10/2002 | Takano et al. | 320/137 |
| 2003/0057918 A1* | 3/2003 | Aoki et al. | 320/136 |
| 2003/0169017 A1* | 9/2003 | Ariga et al. | 320/125 |

(Continued)

FOREIGN PATENT DOCUMENTS

| | | |
|---|---|---|
| CN | 101641850 A | 2/2010 |
| JP | 2000-069687 A | 3/2000 |
| JP | 2010-522533 A | 7/2010 |

(Continued)

OTHER PUBLICATIONS

International Search Report and Written Opinion received for PCT Patent Application No. PCT/US2013/044587, mailed on Dec. 17, 2013, 13 pages.

*Primary Examiner* — Arun Williams
(74) *Attorney, Agent, or Firm* — International IP Law Group, P.L.L.C.

(57) ABSTRACT

A method and system for applying a multi-rate charge to a battery are included herein. The method includes detecting a plurality of predetermined electrical measurements and a plurality of predetermined charge currents. The method also includes detecting an electrical measurement of the battery. Additionally, the method includes selecting a charge current from the plurality of predetermined charge currents to be applied to the battery based on the electrical measurement of the battery and the plurality of predetermined electrical measurements. Furthermore, the method includes applying the charge current to the battery. The method also includes detecting a plurality of subsequent electrical measurements of the battery. In addition, the method includes applying a plurality of subsequent charge currents to the battery based on the plurality of subsequent electrical measurements of the battery and the plurality of predetermined charge currents.

26 Claims, 4 Drawing Sheets

(56) References Cited

U.S. PATENT DOCUMENTS

2008/0048614 A1* 2/2008 Partin et al. .................. 320/116
2010/0127669 A1* 5/2010 Iida .............................. 320/162

FOREIGN PATENT DOCUMENTS

| WO | 2014/004035 | A2 | 1/2014 |
| WO | 2014/004035 | A3 | 3/2014 |

* cited by examiner

| CAPACITY LEVEL | CHARGE CURRENT |
|---|---|
| 1 WATT-HOUR | 2.5 A |
| 2 WATT-HOURS | 1.75 A |
| 3 WATT-HOURS | 1.25 A |
| ... | ... |

CHARGING A BATTERY USING A MULTI-RATE CHARGE

BACKGROUND

1. Field

This disclosure relates generally to charging a battery and more specifically, but not exclusively, to a multi-rate battery charge.

2. Description

Mobile computing devices rely on a variety of batteries for power. As the mobile computing devices become more complex, the power consumption of the mobile computing devices increases. As a result, the batteries that provide power to the mobile computing devices may have larger capacities because the batteries may be rapidly discharged. Therefore, various methods for decreasing the amount of time to charge a battery have been developed. For example, one method of charging a battery entails sending a constant current to a battery for a period of time. However, the batteries can take a significant amount of time to receive a full charge. Additional battery charging methods can attempt to charge the batteries at a higher charge rate to reduce the charge time. However, charging a battery at a higher charge rate can damage the battery and reduce the life of the battery. Therefore, a process to charge a battery in a faster amount of time without damaging the battery would help maintain power to the mobile computing devices, while preserving the life of the battery.

BRIEF DESCRIPTION OF THE DRAWINGS

The following detailed description may be better understood by referencing the accompanying drawings, which contain specific examples of numerous objects and features of the disclosed subject matter.

DETAILED DESCRIPTION

According to embodiments of the subject matter disclosed in this application, a multi-rate charge can be utilized to charge a battery. The multi-rate charge involves applying several different charge currents to a battery based on the electrical measurements of the battery. An electrical measurement, as referred to herein, can include the capacity level of a battery or the maximum safe voltage of a battery. The capacity level, as referred to herein, is the amount of electrical energy stored in a battery at a particular point in time. The maximum safe voltage of a battery is the maximum predetermined voltage that can be applied to the battery without causing damage to the battery. In some embodiments, the maximum safe voltage is provided by an individual, group or organization. For example, a manufacturer of the battery may provide the maximum safe voltage. A charge current, as referred to herein, includes any electrical current applied to a battery. For example, a charge current may include an electrical current received from an AC source and applied to a battery. A battery, as referred to herein, includes any device that can store electrical energy. An example of a battery is a lithium ion battery which may include lithium cobalt oxide, lithium manganese oxide, lithium nickel oxide, or lithium iron phosphate, among other chemicals.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
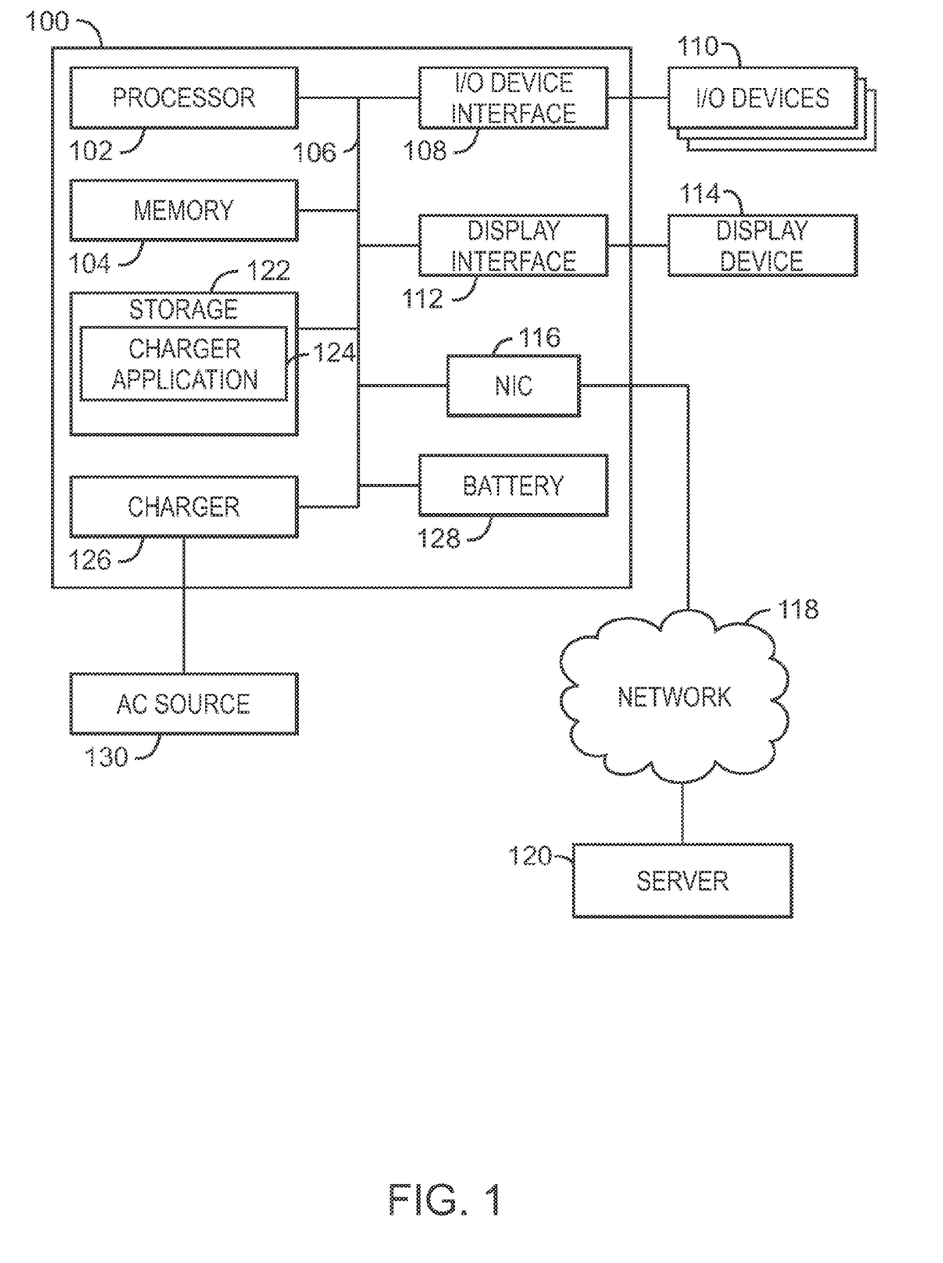
FIG. 1 is a block diagram of an example of a computing system that includes techniques for applying a multi-rate charge to a battery.

FIG. 1 is a block diagram of an example of a computing system that includes techniques for applying a multi-rate charge to a battery. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to implement a method that includes applying a multi-rate charge to a battery.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100.

A network interface card (NIC) 116 may be adapted to connect the computing system 100 through the system bus 106 to a network 118. The network 118 may be a wide area network (WAN), local area network (LAN), or the Internet, among others. Through the network 118, the computing system 100 may communicate with a server 120.

The storage device 122 can include a hard drive, an optical drive, a USB flash drive, an array of drives, or any combinations thereof. The storage device 122 may include a charging application 124 that is adapted to apply the multi-rate battery charge as described herein. The charging application 124 may obtain electrical measurements or other charging information from the charger 126, the server 120, and/or the battery 128. For example, the charger 126 may detect predetermined charge currents and predetermined capacity levels from the server 120. Also, the charging application 124 may detect an electrical measurement, such as a capacity level or voltage of the battery 128, from the charger 126. The battery 124 can include any device that stores electrical energy, such as lithium ion batteries. As discussed above, lithium ion batteries may include lithium cobalt oxide, lithium manganese oxide, lithium nickel oxide, or lithium iron phosphate, among other chemicals.

The charger 126 can apply an electrical current to the battery 128. For example, the charger 126 can receive the electrical current to apply to the battery 128 from an AC source 130 such as an electrical outlet. The charger 126 can also detect the current electrical measurement of the battery 128. For example, the charger 126 can detect the voltage of the battery at any point in time.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., battery fuel gauge, power management integrated circuits, additional network interfaces, etc.). For example, the computing system 100 may include a fuel gauge or a power management integrated circuit that provides the current capacity level of the battery 128 to the charging application 124. Furthermore, any of the functionalities of the charging application 124 may be partially, or entirely, implemented in hardware and/or in the processor 102. For example, the functionality may be implemented with an application specific integrated circuit, in logic implemented in the processor 102, in a battery 128, in a charger 126, or in any other device.

Figure 2:
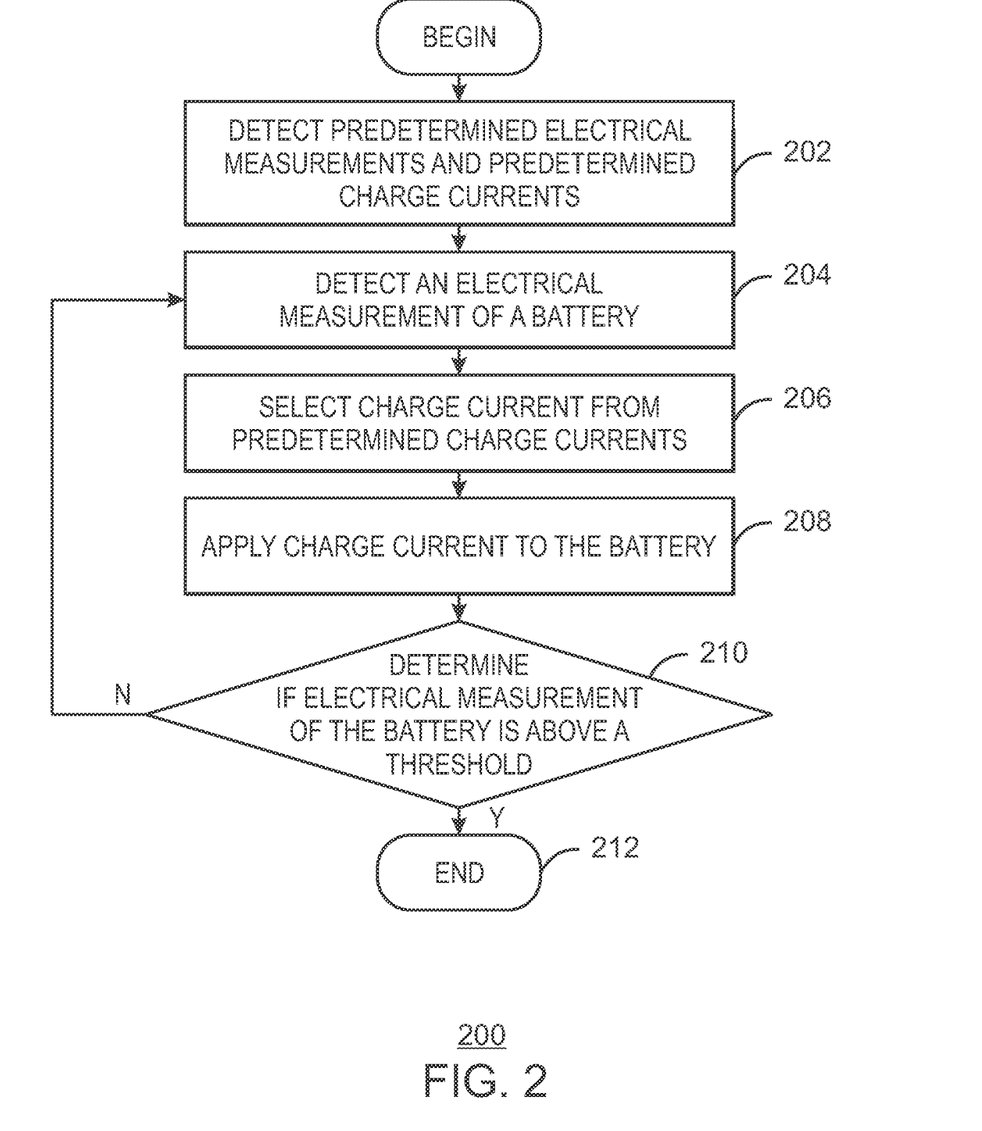
FIG. 2 is a process flow diagram illustrating an example of a method for applying a multi-rate charge to a battery.

FIG. 2 is a process flow diagram illustrating an example of a method for applying a multi-rate charge to a battery. The method for applying a multi-rate charge to a battery may be implemented with a computing system 100, in which a charging application 124 receives charging information from a server 120, a charger 126 and/or a battery 128. Charging information, as referred to herein, includes any electrical measurements, charging currents, or any other information that can be used to apply a multi-rate charge to a battery.

At block 202, predetermined electrical measurements and predetermined charge currents are detected. As discussed above, electrical measurements can include the voltages of batteries, capacity levels of batteries, or other electrical measurements that indicate the energy stored in the battery. For example, a capacity level may indicate that a battery has stored two watt-hours. The charge current refers to an electrical current applied to a battery. An example of a charge current is a two amp current applied to a battery. Each charge current corresponds with an electrical measurement of the battery at a point in time. For example, a battery that has stored two watt-hours may receive a different charge current than a battery that has stored four watt-hours.

Figure 3:
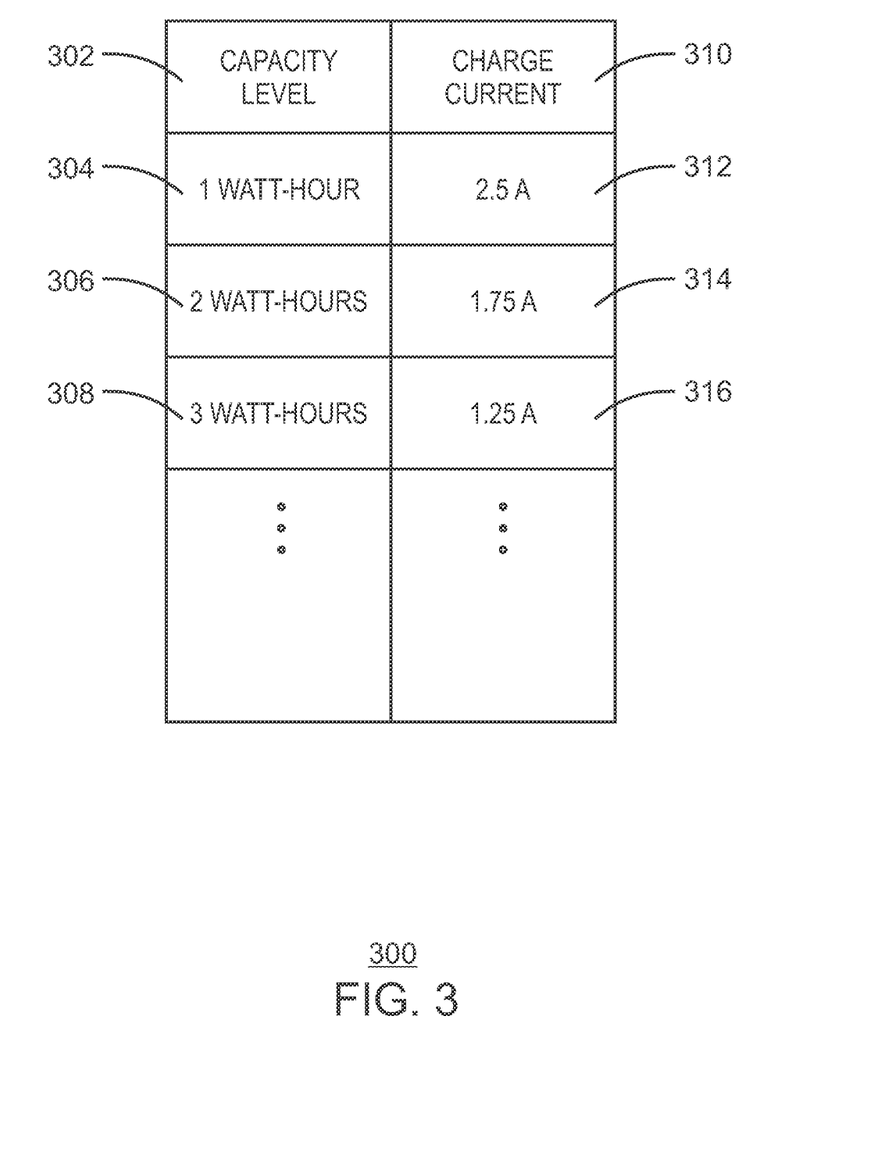
FIG. 3 illustrates an example of a table that includes predetermined charge currents and predetermined battery capacity levels.

In some embodiments, a table that includes a set of predetermined electrical measurements and corresponding predetermined charge currents are stored in a storage device. An example of a table that stores predetermined charge currents and predetermined electrical measurements is illustrated in FIG. 3, which is discussed in greater detail below. In some embodiments, the predetermined charge currents and predetermined electrical measurements are based on information obtained from the manufacturer of the battery. For example, the manufacturer of a battery may release information indicating the maximum charge current that can be applied to a particular battery. The maximum charge current may then be stored as the first predetermined charge current to be applied to a battery. Additionally, the initial charge current may be limited to the maximum charge current for the battery. In some embodiments, the subsequent predetermined charge currents may be lower charge currents. For example, the maximum charge current may be 2.0 amps and the subsequent charge currents may be 1.75 amps, 1.25 amps, 0.75 amps and 0.25 amps. In this example, five different charge currents may be applied to a battery during the battery charging process.

At block 204, the electrical measurement of a battery is detected. The electrical measurement of a battery at a particular point in time can be measured by detecting the amount of electrical energy stored in the battery. For example, some batteries can store four watt-hours of electrical current. However, a battery that can store four watt-hours of electrical current may only have two watt-hours of electrical energy stored at a particular point in time. Therefore, the capacity level may be two watt-hours. In some embodiments, the electrical measurement may be determined as a ratio of the amount of electrical energy stored in the battery versus the total amount of electrical energy that can be stored in the battery. In the example above, a battery that can store four watt-hours of electrical energy, but has two watt-hours of electrical energy stored, may have a capacity level of fifty percent. In other embodiments, the electrical measurement may be calculated and represented in any number of different configurations. For example, a battery that can store three volts of electrical energy, but has one volt stored, might have an electrical measurement of 0.33.

At block 206, a charge current is selected from the predetermined charge currents. In some embodiments, the charge rate selected from the predetermined charge currents is based on the capacity level of the battery. For example, if a battery has a capacity level of two watt-hours, the charge rate corresponding to a two watt-hour capacity level is selected. In other embodiments, the charge rate selected from the predetermined charge currents is based on the voltage of the battery. For example, a charge rate corresponding to a battery that has stored two volts is selected from the predetermined charge currents. The charge rate can also be selected from the predetermined charge currents based on the amount of time a charge current has been applied to a battery. For example, a subsequent charge current may be selected from the predetermined charge currents after a previous charge current is applied to a battery for a period of time.

At block 208, a charge current is applied to the battery. In some embodiments, a charger can receive an electrical current from an electrical source, such as an AC source. The charger can then apply a portion of the electrical current to a battery. For example, a charger can receive five amps of electrical current from an AC source, but the charger may only apply three amps to a battery based on the capacity level of the battery and the corresponding charge current. In some embodiments, the charge current applied to the battery is reduced when heat from the battery exceeds a threshold.

At block 210, it is determined if the electrical measurement of the battery is above a threshold. For example, a battery may store a maximum of four watt-hours. Therefore, after four watt-hours have been applied to the battery, the process ends at block 212. In some embodiments, the battery may not be charged to the full capacity of the battery. For example, a battery that can store 4 watt-hours may only receive 3.8 watt-hours before the process ends at block 212. In other embodiments, the battery may be charged beyond the full capacity of the battery. For example, a battery that can store 4 volts may receive 4.2 volts before a charger stops applying a charge to the battery.

If an electrical measurement of a battery is below a threshold, the process returns to block 204 to detect the subsequent electrical measurement of the battery. Therefore, the process continuously monitors the electrical measurement of the battery until the electrical measurement of the battery exceeds a threshold value. By monitoring the changing electrical measurements of the battery, several of the predetermined charge currents can be applied to the battery.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. In some embodiments, the predetermined charge currents may be modified as a battery is charged. For example, a charge current higher than the selected charge current may be applied to a battery if the temperature of the battery does not increase. Therefore, the number of charge currents to apply to a battery and the electrical current of the charge currents may be dynamically modified based on a battery's temperature during charging.

Additionally, the method 200 may be used to charge a battery any number of times. For example, the method 200 may apply a multi-rate charge to a battery so that the battery has an electrical measurement above a threshold. Subsequently, the electrical measurement of the battery may fall below the threshold. In this example, the method 200 may be used again to apply a multi-rate charge to the battery. In some embodiments, the method 200 may continuously monitor the electrical measurements of a battery and apply a multi-rate charge to the battery whenever a battery has an electrical measurement below a threshold.

FIG. 3 illustrates an example of a table that includes predetermined charge currents and predetermined electrical measurements. In this example, battery capacity levels represent the electrical measurements. However, any other electrical measurement, such as the voltage of a battery, can also be utilized to determine the charge current to apply to a battery.

The capacity level column 302 includes entries for predetermined capacity levels of a battery. For example, blocks 304, 306, and 308 include different capacity level ranges for a battery. The charge current column 310 includes entries for charge currents that correspond to the different capacity levels of a battery. For example, the charge current stored at block 312 corresponds with the capacity level stored at block 304. Therefore, a battery with a capacity level of 1 watt-hour receives a charge current of 2.5 amps. Subsequently, when the capacity level of the battery increases to 2 watt-hours, the reduced charge current of 1.75 amps at block 314 is applied to the battery. In some embodiments, the table may be modified so that the number of charge currents increases. In other embodiments, the charge current is determined by the capacity level of the battery and the voltage of the battery.

As discussed above in relation to FIG. 2, the battery receives an initial charge current based on the capacity level of the battery. For example, a battery may begin receiving a charge current when the battery has a capacity level of 3 watt-hours. In this example, an initial charge current of 1.25 amps at block 316 is applied to the battery. Furthermore, in some embodiments, as the capacity level of the battery increases, the electrical current of the charge current decreases. Therefore, multiple decreasing charge currents can be applied to a battery before the capacity level of the battery is above a threshold.

Figure 4:
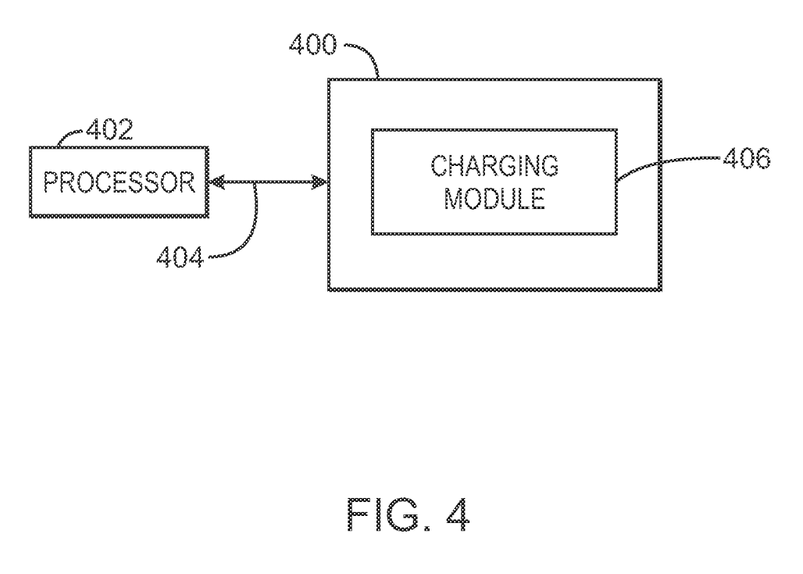
FIG. 4 is a block diagram depicting an example of a tangible, non-transitory, computer-readable medium that allows for a multi-rate charge to be applied to a battery.

FIG. 4 is a block diagram showing a tangible, non-transitory, computer-readable medium 400 that allows a multi-rate charge to be applied to a battery. The tangible, non-transitory, computer-readable medium 400 may be accessed by a processor 402 over a computer bus 404. Furthermore, the tangible, non-transitory, computer-readable medium 400 may include code to direct the processor 402 to perform the steps of the current method.

The various software components discussed herein may be stored on the tangible, non-transitory, computer-readable medium 400, as indicated in FIG. 4. For example, a charging module 406 may be adapted to direct the processor 402 to allow a multi-rate charge to be applied to a battery. It is to be understood that any number of additional software components not shown in FIG. 4 may be included within the tangible, non-transitory, computer-readable medium 400, depending on the specific application.

Example 1

A method for applying a multi-rate charge to a battery is described herein. The method includes detecting a plurality of predetermined electrical measurements and a plurality of predetermined charge currents. The method also includes detecting an electrical measurement of the battery. Additionally, the method includes selecting a charge current from the plurality of predetermined charge currents to be applied to the battery based on the electrical measurement of the battery and the plurality of predetermined electrical measurements. Furthermore, the method includes applying the charge current to the battery. The method also includes detecting a plurality of subsequent electrical measurements of the battery. In addition, the method includes applying a plurality of subsequent charge currents to the battery based on the plurality of subsequent electrical measurements of the battery and the plurality of predetermined charge currents.

The method for applying a multi-rate charge to a battery may apply any number of charge currents to a battery. Also, each charge current may include a lower electrical current than the previous charge current. Alternatively, each charge current may include a higher electrical current than the previous charge current, or each charge current may include an electrical current that is higher or lower than the previous charge current.

Example 2

A computing device is described herein. The computing device includes a processor that is adapted to execute instructions and a storage device that stores instructions. The instructions stored in the storage device cause the processor to detect a plurality of predetermined capacity levels and a plurality of predetermined charge currents, wherein each charge current of the plurality of charge currents is a lower charge current than the previous charge current. The instructions also cause the processor to detect a capacity level of the battery. Additionally, the instructions cause the processor to detect a charge current from the plurality of predetermined charge currents to be applied to the battery based on the capacity level and the plurality of predetermined capacity levels. Furthermore, the instructions cause the processor to apply the charge current to the battery. In addition, the instructions cause the processor to detect a plurality of subsequent capacity levels of the battery. The instructions also cause the processor to apply a plurality of subsequent charge currents to the battery based on the plurality of subsequent capacity levels of the battery and the plurality of predetermined charge currents, wherein each charge current of the plurality of subsequent charge currents is a lower charge current than the previous charge current.

The computing device may contain a charger that applies a multi-rate charge to a battery. Alternatively, the computing device may contain a microcontroller or co-processor that sends commands to a charger to apply a multi-rate charge to a battery. Additionally, the computing device may include a storage device that stores instructions that can apply a multi-rate charge to a battery.

Example 3

At least one machine readable medium having instructions stored therein is described herein. In response to being executed on a computing device, the instructions cause the computing device to apply a multi-rate charge to a battery. The instructions also can cause the computing device to detect a plurality of predetermined capacity levels and a plurality of predetermined charge currents, wherein each charge current of the plurality of subsequent charge currents is a lower charge current than the previous charge current. Additionally, the instructions cause the computing device to detect a capacity level of the battery. Furthermore, the instructions cause the computing device to detect a charge current from the plurality of predetermined charge currents to be applied to the battery based on the capacity level and the plurality of predetermined capacity levels. In addition, the instructions cause the computing device to apply the charge current to the battery. The instructions also cause the computing device to detect a plurality of subsequent capacity levels of the battery. In addition, the instructions cause the computing device to apply a plurality of subsequent charge currents to the battery based on the plurality of subsequent capacity levels of the battery and the plurality of predetermined charge currents, wherein each charge current of the plurality of subsequent charge currents is a lower charge current than the previous charge current.

The instructions that can cause a computing device to apply a multi-rate charge to a battery can also search a table for the charge current that corresponds to the capacity level of the battery and a capacity level from the predetermined capacity levels. Additionally, the instructions can modify the table to increase the number of predetermined charge currents based on an amount of time to detect the capacity level of the battery. Furthermore, the instructions can reduce the charge current to the battery when heat from the battery exceeds a threshold. The instructions can also detect a maximum charge current that the battery can accept and limit the charge current to the maximum current.

An advantage of one or more of the embodiments is that less heat is produced inside the battery when a multi-rate charge is applied to the battery. Accordingly, another advantage of one or more embodiments is an increased battery cycle life. An additional advantage of one or more embodiments is a faster charge time of a battery when a multi-rate charge is applied to the battery.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a knifing sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for charging a battery, comprising:
   detecting a plurality of predetermined electrical measurements and a plurality of predetermined charge currents, wherein the predetermined electrical measurements indicate an energy stored in the battery;
   detecting an electrical measurement of the battery;
   selecting a charge current from the plurality of predetermined charge currents to be applied to the battery based on the electrical measurement of the battery and the plurality of predetermined electrical measurements;
   applying the charge current to the battery;
   detecting a plurality of subsequent electrical measurements of the battery; and
   applying a plurality of subsequent charge currents to the battery based on the plurality of subsequent electrical measurements of the battery and the plurality of predetermined charge currents.

2. The method of claim 1, wherein the electrical measurement of the battery comprises a voltage of the battery.

3. The method of claim 1, wherein the electrical measurement of the battery comprises a capacity level of the battery.

4. The method of claim 1, wherein detecting a charge current from the plurality of predetermined charge currents to be applied to the battery based on the capacity level of the battery and the plurality of predetermined capacity levels comprises searching a table for the charge current that corresponds to the capacity level of the battery.

5. The method of claim 4, further comprising modifying the table to increase the number of predetermined charge currents.

6. The method of claim 1, wherein each charge current of the plurality of charge currents is a lower charge current than the previous charge current.

7. The method of claim 1, further comprising determining the charge current based on a voltage of the battery and the capacity level of the battery.

8. The method of claim 1, further comprising:
   detecting a maximum current that the battery can accept; and
   limiting the charge current to the maximum current.

9. The method of claim 1, further comprising:
   determining the capacity level of the battery is above a threshold; and
   preventing a charge current from being applied to the battery.

10. A computing device for charging a battery, comprising:
    a processor that executes non-transitory stored instructions; and
    a storage device that stores instructions, the storage device, comprising processor executable code that, when executed by the processor, causes the processor to:
    detect a plurality of predetermined capacity levels and a plurality of predetermined charge currents, wherein the predetermined electrical measurements indicate an energy stored in the battery and each charge current of the plurality of charge currents is a lower charge current than the previous charge current;
    detect a capacity level of the battery;
    detect a charge current from the plurality of predetermined charge currents to be applied to the battery based on the capacity level and the plurality of predetermined capacity levels;
    apply the charge current to the battery;
    detect a plurality of subsequent capacity levels of the battery; and
    apply a plurality of subsequent charge currents to the battery based on the plurality of subsequent capacity levels of the battery and the plurality of predetermined charge currents, wherein each charge current of the plurality of subsequent charge currents is a lower charge current than the previous charge current.

11. The computing device of claim 10, wherein the processor executable code that causes the processor to detect a charge current from the plurality of predetermined charge currents to be applied to the battery based on the capacity level and the plurality of predetermined capacity levels also causes the processor to search a table for the charge current that corresponds to the capacity level of the battery.

12. The computing device of claim 11, further comprising processor executable code that causes the processor to modify the table to increase the number of predetermined charge currents based on an amount of time to detect the capacity level of the battery.

13. The computing device of claim 10, wherein the charge current to the battery is reduced when heat from the battery exceeds a threshold.

14. The computing device of claim 10, wherein the processor executable code also causes the processor to:
    detect a maximum current that the battery can accept; and
    limit the charge current to the maximum current.

15. The computing device of claim 10, wherein the processor executable code also causes the processor to:
    determine the capacity level of the battery is above a threshold; and
    prevent a charge current from being applied to the battery.

16. At least one non-transitory machine readable medium comprising a plurality of instructions that, in response to being executed on a computing device, cause the computing device to:
    detect a plurality of predetermined capacity levels and a plurality of predetermined charge currents, wherein the predetermined electrical measurements indicate an energy stored in the battery and each charge current of the plurality of charge currents is a lower charge current than the previous charge current;
    detect a capacity level of the battery;
    detect a charge current from the plurality of predetermined charge currents to be applied to the battery based on the capacity level and the plurality of predetermined capacity levels;
    apply the charge current to the battery;
    detect a plurality of subsequent capacity levels of the battery; and
    apply a plurality of subsequent charge currents to the battery based on the plurality of subsequent capacity levels of the battery and the plurality of predetermined charge currents, wherein each charge current of the plurality of subsequent charge currents is a lower charge current than the previous charge current.

17. The machine readable claim of 16, wherein the plurality of instructions also cause the computing device to search a table for the charge current that corresponds to the capacity level of the battery.

18. The machine readable claim of 17, wherein the plurality of instructions also cause the computing device to modify the table to increase a number of charge currents based on an amount of time to detect the capacity level of the battery.

19. The machine readable claim of 16, wherein the charge current to the battery is reduced when heat from the battery exceeds a threshold.

20. The machine readable claim of 16, wherein the plurality of instructions also cause the computing device to:

detect a maximum current that the battery can accept; and limit the charge current to the maximum current.

21. An electronic device, comprising:
a battery; and
a battery charging mechanism that detects a plurality of predetermined capacity levels and a plurality of predetermined charge currents, wherein the predetermined electrical measurements indicate an energy stored in the battery and wherein each charge current of the plurality of charge currents is a lower charge current than the previous charge current, the battery charging mechanism further detects a capacity level of the battery, the battery charging mechanism further detects a charge current from the plurality of predetermined charge currents to be applied to the battery based on the capacity level and the plurality of predetermined capacity levels, applies the charge current to the battery, detects a plurality of subsequent capacity levels of the battery, and applies a plurality of subsequent charge currents to the battery based on the plurality of subsequent capacity levels of the battery and the plurality of predetermined charge currents, wherein each charge current of the plurality of subsequent charge currents is a lower charge current than the previous charge current.

22. The electronic device of claim 21, wherein the battery charging mechanism searches a table for the charge current that corresponds to the capacity level of the battery.

23. The electronic device of claim 21, wherein the battery charging mechanism modifies the table to increase the number of predetermined charge currents based on an amount of time to detect the capacity level of the battery.

24. The electronic device of claim 21, wherein the charge current to the battery is reduced when heat from the battery exceeds a threshold.

25. The electronic device of claim 21, wherein the battery charging mechanism detects a maximum current that the battery can accept, and limits the charge current to the maximum current.

26. The electronic device of claim 21, wherein the battery charging mechanism determines the capacity level of the battery is above a threshold, and prevents a charge current from being applied to the battery.

* * * * *